US009973142B2

(12) United States Patent
Stearns

(10) Patent No.: US 9,973,142 B2
(45) Date of Patent: May 15, 2018

(54) SNOW FENCE FOR A SOLAR PANEL

(71) Applicant: Vermont Slate & Copper Services, Inc., Morrisville, VT (US)

(72) Inventor: Brian Cecil Stearns, Stowe, VT (US)

(73) Assignee: Vermont Slate and Copper Services, Inc., Morrisville, VT (US)

( * ) Notice: Subject to any disclaimer, the term of this patent is extended or adjusted under 35 U.S.C. 154(b) by 915 days.

(21) Appl. No.: 14/199,499

(22) Filed: Mar. 6, 2014

(65) Prior Publication Data

US 2014/0252288 A1 Sep. 11, 2014

Related U.S. Application Data

(60) Provisional application No. 61/773,464, filed on Mar. 6, 2013, provisional application No. 61/792,389, filed on Mar. 15, 2013, provisional application No. 61/828,353, filed on May 29, 2013.

(51) Int. Cl.

| | |
|---|---|
| ***E04D 13/10*** | (2006.01) |
| ***E01F 7/02*** | (2006.01) |
| ***H02S 40/12*** | (2014.01) |
| ***F24J 2/46*** | (2006.01) |

(52) U.S. Cl.

CPC .............. *H02S 40/12* (2014.12); *E04D 13/10* (2013.01); *F24J 2/4607* (2013.01); *E04D 13/106* (2013.01); *F24J 2002/4663* (2013.01); *Y02E 10/40* (2013.01)

(58) Field of Classification Search

CPC ..... E04D 13/10; E04D 13/103; E04D 13/106; E01F 7/02; E01F 7/00; E01F 7/106; H02S 40/12; F24J 2/4607; F24J 2002/4663; Y02E 10/40

See application file for complete search history.

(56) References Cited

U.S. PATENT DOCUMENTS

| | | | |
|---|---|---|---|
| 4,321,745 | A | 3/1982 | Ford |
| 4,558,544 | A | 12/1985 | Albrecht et al. |
| 4,744,187 | A | 5/1988 | Tripp |
| 4,796,403 | A | 1/1989 | Fulton |
| 5,094,056 | A | 3/1992 | Peters |
| 5,333,423 | A | 8/1994 | Propst |
| 5,479,745 | A | 1/1996 | Kawai et al. |
| 5,501,754 | A | 3/1996 | Hiraguri |
| 5,595,366 | A | 1/1997 | Cusimano et al. |
| 5,791,096 | A | 8/1998 | Chen |

(Continued)

FOREIGN PATENT DOCUMENTS

| | | |
|---|---|---|
| DE | 10062697 | 6/2006 |
| DE | 102005002828 | 8/2006 |

(Continued)

*Primary Examiner* — Phi D A

(74) *Attorney, Agent, or Firm* — The Law Office of Mark Williams, PLLC

(57) ABSTRACT

An accessory for a solar panel assembly includes a bracket defining an elongated portion extending in a first direction and including a slot, a connector coupled to the bracket and configured to engage at least one panel frame of the solar panel assembly, and a fence member including a first portion and a second portion. The first portion including a planar surface oriented at an angle relative to the bracket portion, and the second portion includes a projection that removably engages the slot.

14 Claims, 14 Drawing Sheets

(56) References Cited

U.S. PATENT DOCUMENTS 5,862,635 A 1/1999 Linse et al.
6,024,330 A 2/2000 Mroz et al.
6,360,491 B1 3/2002 Ullman
6,442,906 B1 9/2002 Hwang
6,453,623 B1 9/2002 Nelson et al.
6,536,729 B1 3/2003 Haddock
6,672,018 B2 1/2004 Shingleton
6,772,564 B2 8/2004 Leon
7,001,098 B2 2/2006 Lin et al.
7,174,677 B1 2/2007 Dressler
7,592,537 B1 9/2009 West
7,600,349 B2 10/2009 Liebendorfer
7,857,269 B2 12/2010 Plaisted et al.
8,109,048 B2 2/2012 West et al.
8,122,648 B1 2/2012 Liu
8,146,299 B2 4/2012 Stearns et al.
8,151,522 B2 4/2012 Stearns et al.
8,153,700 B2 4/2012 Stearns et al.
8,166,713 B2 5/2012 Stearns et al.
8,166,720 B2 5/2012 Garrigus
8,177,180 B2 5/2012 Plaisted et al.
8,181,398 B2 5/2012 Stearns et al.
8,209,914 B2 7/2012 Stearns et al.
8,225,557 B2 7/2012 Stearns et al.
8,245,454 B2 8/2012 Stearns et al.
8,272,174 B2 9/2012 Stearns et al.
8,328,149 B2 12/2012 McLaughlin
8,375,654 B1 2/2013 West et al.
8,397,443 B2 3/2013 Blom et al.
8,413,388 B2 4/2013 Stearns et al.
8,505,864 B1 * 8/2013 Taylor .................... F24J 2/5258 248/226.12
8,584,406 B2 11/2013 Wexler et al.
8,627,617 B2 1/2014 Haddock et al.
8,683,761 B2 4/2014 Danning
8,733,037 B2 5/2014 Bindschedler et al.
8,740,163 B1 * 6/2014 Taylor .................... F24J 2/5249 248/226.12
8,756,881 B2 6/2014 West et al.
8,806,813 B2 8/2014 Plaisted et al.
8,833,714 B2 9/2014 Haddock et al.
8,857,113 B2 10/2014 Zhang
8,875,455 B1 11/2014 Yang et al.
8,925,263 B2 1/2015 Haddock et al.
8,938,932 B1 1/2015 Wentworth et al.
8,943,765 B2 2/2015 Danning et al.
8,946,540 B1 2/2015 West et al.
8,955,267 B2 2/2015 Wexler et al.
8,984,819 B1 3/2015 Yang et al.
8,991,114 B2 3/2015 West
9,003,729 B2 4/2015 West et al.
9,010,040 B2 4/2015 Damo
9,010,041 B2 4/2015 Danning
9,062,897 B2 6/2015 West et al.
9,080,792 B2 7/2015 Patton et al.
9,097,441 B2 8/2015 West et al.
9,109,371 B2 8/2015 Hudson et al.
9,121,545 B2 9/2015 Stanley
9,154,074 B2 10/2015 West et al.
9,166,524 B2 10/2015 West et al.
9,231,517 B2 1/2016 West et al.
2002/0046506 A1 4/2002 Ullman
2004/0163338 A1 8/2004 Liebendorfer
2006/0010786 A1 1/2006 Rogers
2006/0053706 A1 3/2006 Russell
2006/0260670 A1 11/2006 Terunuma et al.
2007/0245636 A1 10/2007 Ayer
2008/0053008 A1 3/2008 Ohkoshi et al.
2008/0121273 A1 5/2008 Plaisted et al.
2009/0282755 A1 11/2009 Abbott et al.
2009/0309388 A1 12/2009 Ellison
2010/0192505 A1 8/2010 Schaefer
2010/0236155 A1 9/2010 Lanza
2011/0000519 A1 1/2011 West
2011/0000520 A1 1/2011 West
2011/0000526 A1 1/2011 West
2011/0000544 A1 1/2011 West
2011/0179727 A1 7/2011 Liu
2011/0214365 A1 9/2011 Aftanas
2011/0239546 A1 10/2011 Tsuzuki et al.
2011/0260027 A1 10/2011 Farnham, Jr.
2011/0277402 A1 11/2011 Schnitzer
2011/0302857 A1 12/2011 McClellan et al.
2011/0302859 A1 12/2011 Crasnianski
2012/0023843 A1 2/2012 Stearns et al.
2012/0073220 A1 3/2012 Kobayashi et al.
2012/0079781 A1 4/2012 Koller
2012/0102853 A1 5/2012 Rizzo
2012/0125410 A1 5/2012 West et al.
2012/0144760 A1 6/2012 Schaefer et al.
2012/0152326 A1 6/2012 West et al.
2012/0192926 A1 8/2012 Kambara et al.
2012/0233958 A1 9/2012 Stearns
2012/0234378 A1 9/2012 West et al.
2012/0240484 A1 9/2012 Blom et al.
2012/0255598 A1 10/2012 West
2012/0260972 A1 10/2012 West et al.
2012/0266946 A1 10/2012 West et al.
2012/0279558 A1 11/2012 West et al.
2012/0298186 A1 11/2012 West
2012/0298188 A1 11/2012 West et al.
2012/0298817 A1 11/2012 West et al.
2012/0301661 A1 11/2012 West et al.
2013/0008102 A1 1/2013 Bindschedler et al.
2013/0009025 A1 1/2013 Stearns
2013/0074441 A1 3/2013 Stearns
2013/0091786 A1 * 4/2013 DuPont .................. F24J 2/5249 52/173.3
2013/0104471 A1 5/2013 Kobayashi
2013/0125492 A1 * 5/2013 Molek .................... F24J 2/5211 52/489.1
2013/0140416 A1 5/2013 West et al.
2013/0180572 A1 7/2013 West
2013/0180573 A1 7/2013 West
2013/0180574 A1 7/2013 West et al.
2013/0183084 A1 7/2013 West et al.
2013/0192150 A1 * 8/2013 DuPont .................. F24J 2/5203 52/173.3
2013/0333305 A1 12/2013 Stearns et al.
2013/0333310 A1 12/2013 Damo
2014/0026946 A1 1/2014 West et al.
2014/0041321 A1 2/2014 Poivet
2014/0053891 A1 2/2014 West et al.
2014/0102997 A1 4/2014 West et al.
2014/0109496 A1 4/2014 Stapleton
2014/0130847 A1 4/2014 West et al.
2014/0137489 A1 5/2014 Habdank et al.
2014/0158184 A1 6/2014 West et al.
2014/0174511 A1 6/2014 West et al.
2014/0175244 A1 6/2014 West et al.
2014/0182662 A1 7/2014 West et al.
2014/0223838 A1 8/2014 West et al.
2014/0246549 A1 9/2014 West et al.
2014/0251431 A1 9/2014 West et al.
2014/0299179 A1 10/2014 West et al.
2014/0326838 A1 11/2014 West et al.
2014/0331572 A1 11/2014 Singelyn, Jr.
2014/0339179 A1 11/2014 West et al.
2014/0360558 A1 12/2014 West et al.
2015/0013756 A1 1/2015 West et al.
2015/0033658 A1 2/2015 West et al.
2015/0040965 A1 2/2015 West et al.
2015/0040967 A1 2/2015 West et al.
2015/0041251 A1 2/2015 Hudson et al.
2015/0068590 A1 3/2015 West et al.
2015/0069198 A1 3/2015 West et al.
2015/0075100 A1 3/2015 West et al.
2015/0075589 A1 3/2015 West et al.
2015/0075590 A1 3/2015 West
2015/0107168 A1 4/2015 Kobayashi
2015/0155820 A1 6/2015 West
2015/0155821 A1 6/2015 West
2015/0155823 A1 6/2015 West et al.
2015/0168021 A1 6/2015 Wentworth et al.

(56) References Cited

U.S. PATENT DOCUMENTS

| | | | |
|---|---|---|---|
| 2015/0180405 | A1 | 6/2015 | West et al. |
| 2015/0200618 | A9 | 7/2015 | West et al. |
| 2015/0204372 | A1 | 7/2015 | West et al. |
| 2015/0218822 | A1 | 8/2015 | Blazley |
| 2015/0222221 | A1 | 8/2015 | West |
| 2015/0222222 | A1 | 8/2015 | West |
| 2015/0222225 | A1 | 8/2015 | Danning |
| 2015/0249423 | A1 | 9/2015 | Braunstein et al. |
| 2015/0280639 | A1 | 10/2015 | Atchley et al. |
| 2015/0303865 | A1 | 10/2015 | West et al. |
| 2015/0316292 | A1 | 11/2015 | West |

FOREIGN PATENT DOCUMENTS

| | | |
|---|---|---|
| DE | 102005039495 | 3/2007 |
| DE | 102005059487 | 7/2007 |
| DE | 102006022870 | 9/2007 |
| DE | 102007026819 | 12/2007 |
| DE | 102008000293 | 8/2009 |
| DE | 102008012717 | 9/2009 |
| JP | H08296311 | 11/1996 |
| JP | 2642606 | 8/1997 |
| JP | 2931240 | 8/1999 |
| JP | 2972761 | 11/1999 |
| JP | 3041279 | 5/2000 |
| JP | 2000345664 | 12/2000 |
| JP | 2004060358 | 2/2004 |
| JP | 4041805 | 2/2008 |
| JP | 2008127866 | 6/2008 |
| JP | 4382143 | 12/2009 |
| JP | 2010209515 | 12/2009 |
| JP | 2010242367 | 10/2010 |
| JP | 2011006864 | 1/2011 |
| JP | 2011106188 | 6/2011 |
| WO | 2007093421 | 8/2007 |
| WO | 2012125327 | 9/2012 |
| WO | 2013009375 | 1/2013 |
| WO | 2013043816 | 3/2013 |
| WO | 2015020817 | 2/2015 |
| WO | 2015023526 | 2/2015 |
| WO | 2015039007 | 3/2015 |
| WO | 2015042260 | 3/2015 |
| WO | 2015112461 | 7/2015 |
| WO | 2015160644 | 10/2015 |
| WO | 2015183971 | 12/2015 |

* cited by examiner

SNOW FENCE FOR A SOLAR PANEL

CROSS-REFERENCE TO RELATED APPLICATIONS

This application claims the benefit of prior-filed, U.S. Provisional Application Ser. No. 61/773,464, filed Mar. 6, 2013, U.S. Provisional Application Ser. No. 61/792,389, filed Mar. 15, 2013, and U.S. Provisional Application Ser. No. 61/828,353, filed May 29, 2013. The entire contents of all of these documents are hereby incorporated by reference herein.

FIELD OF THE INVENTION

The present invention relates to solar panels and snow fences for solar panels.

SUMMARY

In some embodiments, the invention provides a snow fence for a solar panel assembly, the solar panel assembly including at least one solar panel having a solar panel frame. The snow fence includes a bracket including a slot, a first clamp coupled to the bracket and engaging at least one of the solar panel frame, and a fence member including a first portion and a second portion. The first portion includes a projection that removably engages the slot.

In one aspect, the invention provides an accessory for a solar panel assembly, the solar panel assembly including at least one solar panel having a panel frame supported on a surface. The accessory includes a bracket, a connector, and a fence member. The bracket defines an elongated portion extending in a first direction, and the elongated portion includes a slot. The connector is coupled to the bracket and configured to engage at least one of the panel frames. The fence member includes a first portion and a second portion. The first portion includes a planar surface oriented at an angle relative to the bracket portion. The second portion includes a projection that removably engages the slot.

In another aspect, the invention provides an accessory for a solar panel assembly including at least one solar panel having a panel frame supported on a surface. The accessory includes a bracket, a threaded bolt, a nut, a fence, and a locking member. The bracket defines an elongated portion extending in a first direction, and the elongated portion includes a surface configured to contact the panel frame. The threaded bolt has a first end proximate the elongated portion of the bracket and a second end. The nut is received onto the second end of the bolt and threadingly engages the bolt. The fence includes a first portion and a second portion. The first portion includes a planar surface extending at an angle relative to the first direction of the bracket portion, and the second portion includes a projection that removably engages the bracket. The locking member is coupled to the bracket and includes an end engaging the second portion of the fence to releasably secure the fence relative to the bracket.

In yet another aspect, the invention provides a solar panel assembly supported on a surface. The solar panel assembly includes a first panel frame supporting a first solar panel, a second panel frame supporting a second solar panel, and an accessory. The second panel frame is spaced apart from the first panel frame in a first direction. The accessory includes a bracket, a connector, and a fence. The bracket defines an elongated portion extending in a second direction perpendicular to the first direction. The elongated portion includes a first surface abutting at least a portion of the first panel frame and the second panel frame. The connector is coupled to the bracket and abuts at least a portion of the first panel frame and the second panel frame. The fence includes a first portion and a second portion. The first portion includes a planar surface oriented at an angle relative to the second direction. The second portion includes a projection that removably engages the bracket.

Other aspects of the invention will become apparent by consideration of the detailed description and accompanying drawings.

DETAILED DESCRIPTION

Before any independent embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising,"

or "having" and variations thereof herein is meant to encompass the items listed thereafter and equivalents thereof as well as additional items.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Also, it is to be understood that phraseology and terminology used herein with reference to device or element orientation (such as, for example, terms like "central," "upper," "lower," "front," "rear," etc.) are only used to simplify description of embodiments of the present invention and do not alone indicate or imply that the device or element referred to must have a particular orientation. In addition, terms such as "first" and "second" are used herein for purposes of description and are not intended to indicate or imply relative importance or significance.

Figure 1:
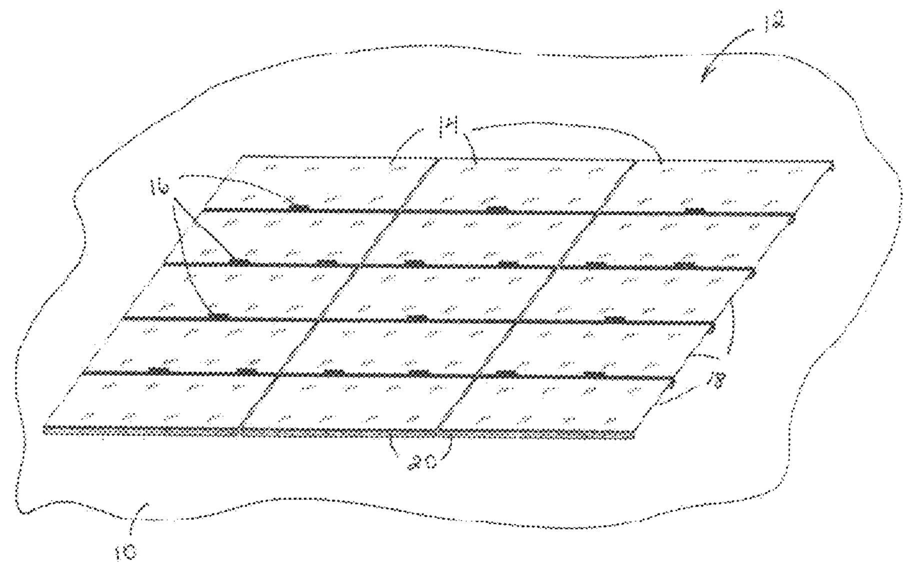
FIG. 1 is a perspective view of a roof with a solar panel assembly with a plurality of snow fences mounted to the solar panel assembly.
Figure 2:
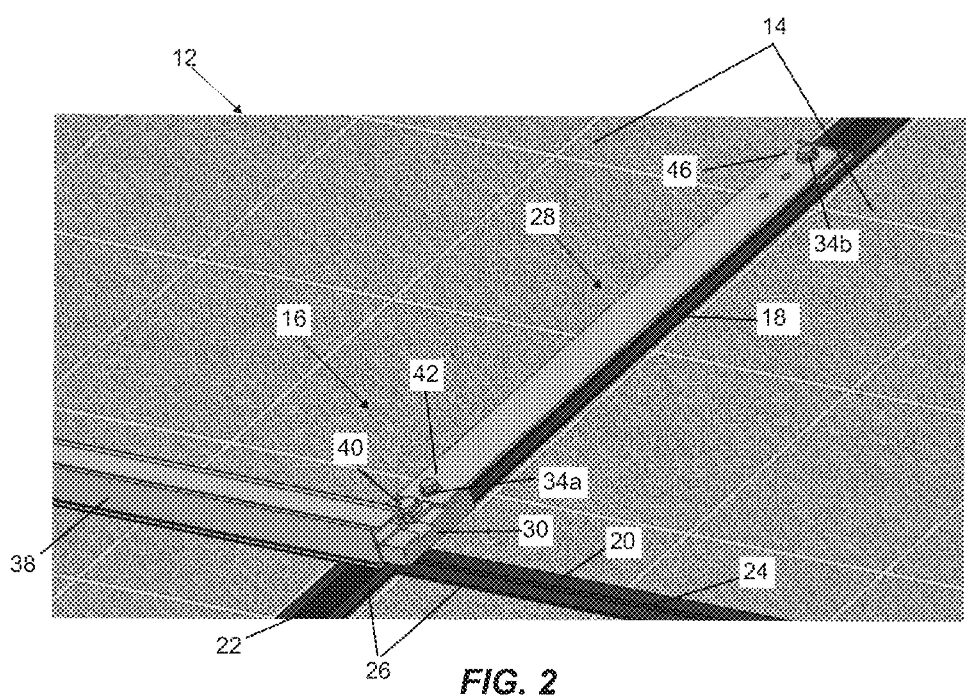
FIG. 2 is a perspective view of the solar panel assembly and a snow fence of FIG. 1.

FIGS. 1 and 2 illustrate a roof 10 (FIG. 1) having a solar panel assembly 12 including a plurality of solar panels 14 mounted to the roof 10. The solar panels 14 are mounted to the roof 10 by any suitable mounting hardware. A plurality of snow guards or snow fences 16 are mounted to the plurality of solar panels 14 on the roof 10. The illustrated solar panel assembly 12 includes fifteen solar panels 14 in three rows of five panels each. Other quantities, configurations and arrangements of solar panels 14 are possible and the illustrated solar panel assembly 12 is given by way of example only.

In the illustrated embodiment, the solar panels 14 have a substantially rectangular shape having two short sides 18 and two long sides 20. The solar panels 14 define elongate spaces therebetween. Specifically, first elongate spaces 22 extend between adjacent short sides in a first direction 18 and second elongate spaces 24 extend between adjacent long sides 20 in a second direction. In the illustrated embodiment, the second direction is perpendicular to the first direction and the second elongate spaces 24 are substantially parallel to an apex of the roof 10. In the illustrated embodiment, the snow fences 16 are positioned in the second elongate spaces 24.

Many of the roof surfaces that the panels are being installed over are asphalt shingles. When solar panels 14 are installed over the top of these asphalt shingle surfaces the smooth and almost frictionless glass panel surface allows the snow mass to slide downwardly off the roof like an avalanche.

FIGS. 2-6 illustrate snow fences 16 positioned adjacent the solar panels 14 for preventing this avalanche effect. The solar panels 14 each have a solar panel frame 26 around a perimeter of the respective solar panel 14. The illustrated snow fence 16 includes a strap 28, a bracket 30, a first coupling device 34*a*, a second coupling device 34*b*, a bar or fence member 38, and a locking member 40. The strap 28 includes a first end 42 and a second end 46. The bracket 30 is positioned adjacent the first end 42, and in the illustrated embodiment the bracket 30 is coupled to the first end 42. The first coupling device 34*a* couples the bracket 30 and the first end 42 of the strap 28 to the solar panel frames 26. The second coupling device 34*b* couples the second end 46 of the strap 28 to the solar panel frames 26. In the illustrated embodiment, the coupling devices 34*a*, 34*b* are positioned between the solar panel frames 26 in the first elongate spaces 22 and the strap 28 is oriented substantially parallel to the first elongate spaces 22.

Figure 3:
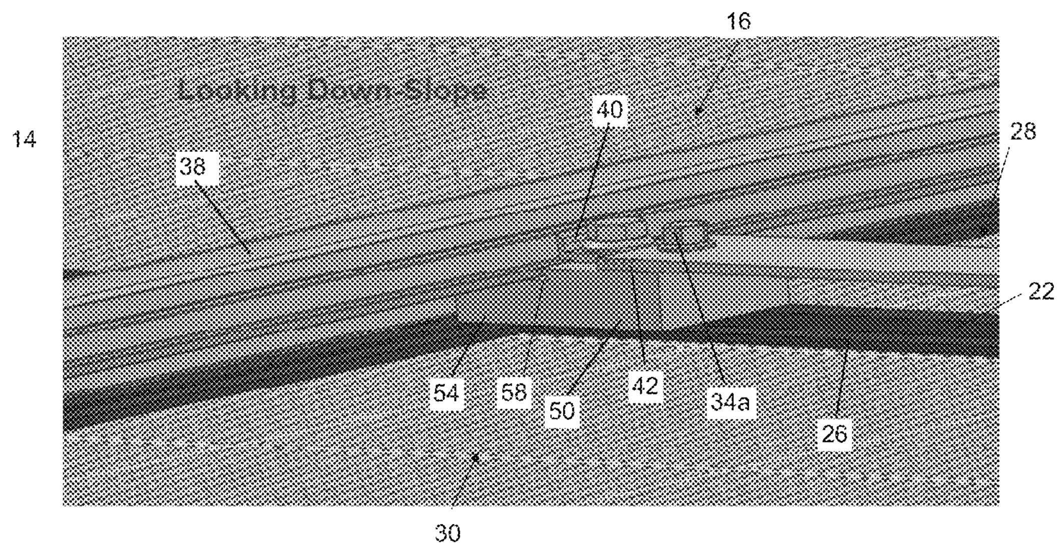
FIG. 3 is a reverse perspective view of the solar panel assembly and snow fence of FIG. 2, as viewed down the surface of the solar panel assembly.
Figure 4:
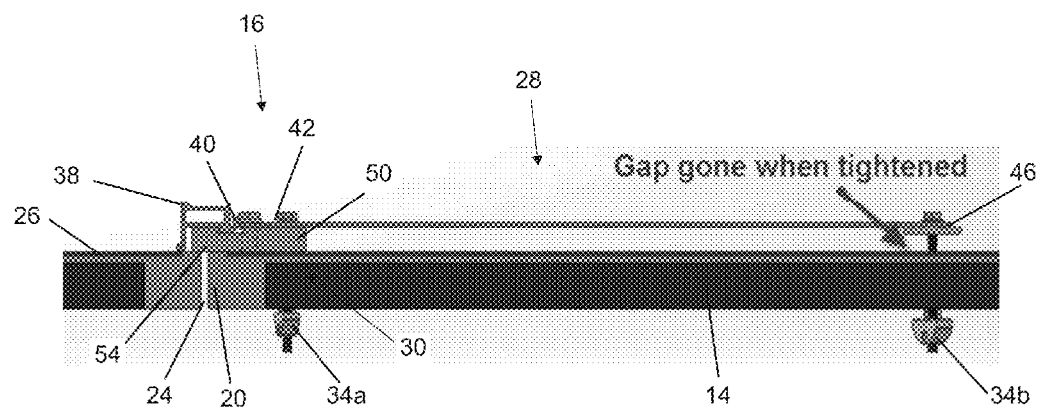
FIG. 4 is a side cross-section view of the solar panel assembly and snow fence of FIG. 2.
Figure 5:
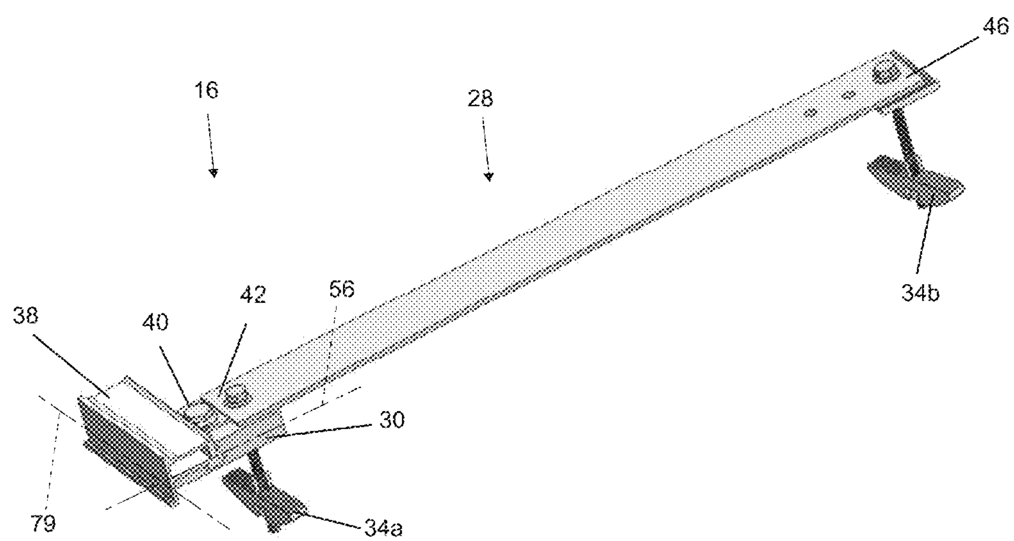
FIG. 5 is a perspective view of one snow fence.
Figure 6:
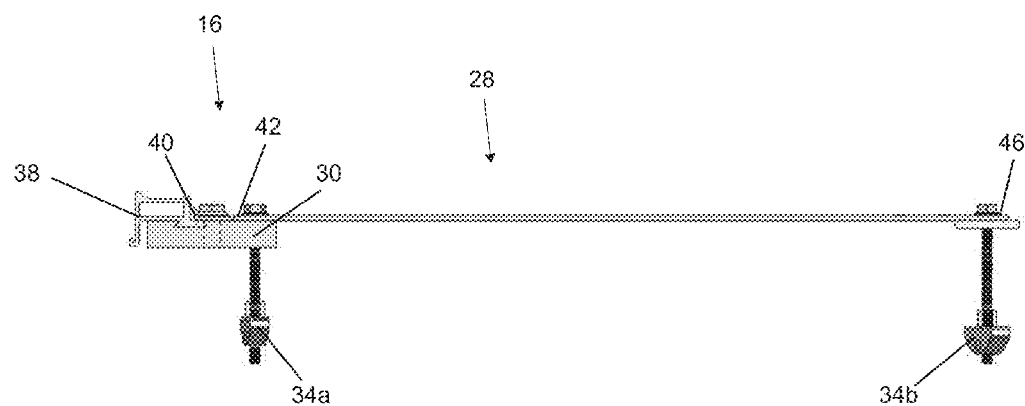
FIG. 6 is a side view of the snow fence of FIG. 1.
Figure 7:
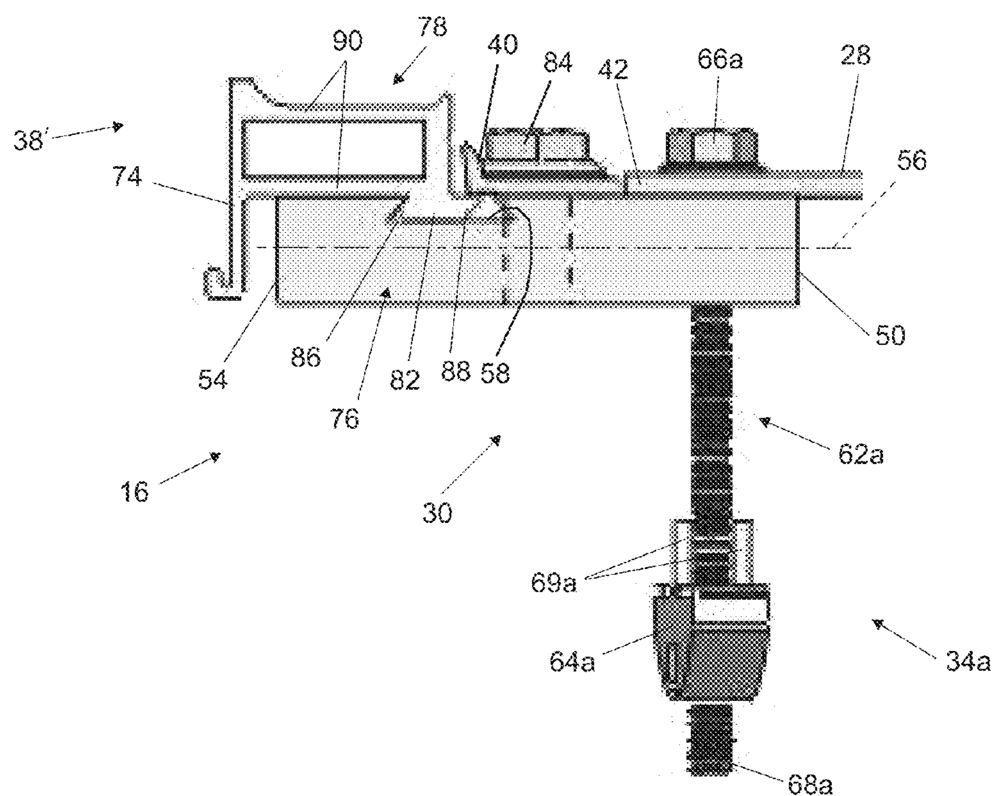
FIG. 7 is an enlarged side view of a portion of the snow fence of FIG. 6.

In the illustrated embodiment, the bracket 30 has a substantially rectangular shape and a flat lower surface that rests on top of the solar panel frames 26. As best shown in FIG. 7, the bracket 30 is elongated and includes a first end 50 and a second end 54 and defines an axis 56 therebetween. In the illustrated embodiment, as best shown in FIGS. 3 and 4, the first end 42 of the strap 28 is coupled to the bracket 30 proximate the first end 50 by the first coupling device 34*a*. In other embodiments, the bracket 30 may be coupled to the strap 28 in other ways, such as, for example, a bolt, screw, other threaded or non-threaded fastener. The bracket 30 also includes a slot 58 for receiving a portion of the fence member 38. In the illustrated embodiment, the slot 58 is positioned proximate the second end 54.

As best shown in FIG. 7, the first coupling device 34*a* includes an elongate portion 62*a* and a nut 64*a*. In one embodiment, the elongate portion 62*a* has a first end 66*a* and a distal end 68*a* to which the nut 64*a* is coupled. The first end 66*a* extends through the bracket 30 and through the first end 42 of the strap 28. In the illustrated embodiment, the elongate portion 62*a* is a bolt that extends between adjacent solar panel frames 26. The nut 64*a* moves between an uncoupled position and a coupled position in which the nut 64*a* abuts a lower portion of adjacent solar panel frames 26 and a lower surface of the bracket 30 is secured against an upper portion of the solar panel frames 26. In the illustrated embodiment, the nut 64*a* threadably engages the elongate portion 62*a* to clamp the solar panel frames 26 between the nut 64*a* and the lower surface of the bracket 30, and the nut 64*a* includes fingers 69*a* that extend along a portion of the elongate portion 62*a* to prevent rotation of the nut 64*a*. In some embodiments, the nut 64*a* is spring-loaded toward the coupled position, such that, upon insertion of the first coupling device 34*a*, once the nut 64*a* is clear of the solar panel frame 26, the spring biases the nut 64*a* into the coupled position.

Figure 8:
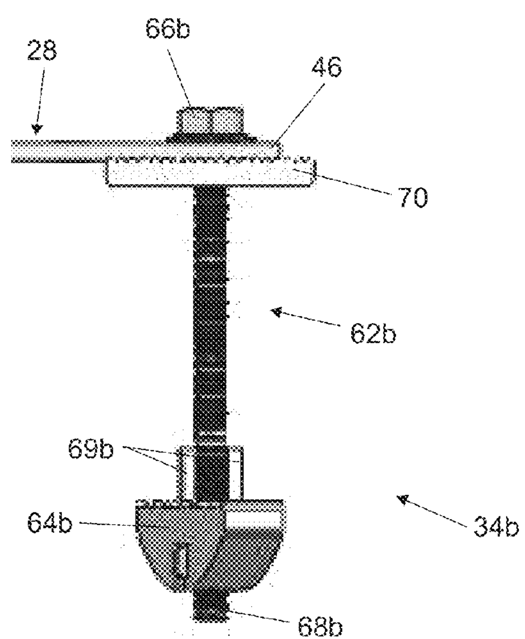
FIG. 8 is an enlarged side view of a portion of the snow fence of FIG. 6.

Similarly, as shown in FIG. 8, the second coupling device 34*b* includes an elongate portion 62*b* and a nut 64*b*. The elongate portion 62*b* has a first end 66*b* and a distal end 68*b* to which the nut 64*b* is coupled. The first end 66*b* extends through the second end 46 of the strap 28 and through a washer 70. In the illustrated embodiment, the elongate portion 62*b* is a bolt that extends between adjacent solar panel frames 26. The nut 64*b* rotates between an uncoupled position and a coupled position in which the nut 64*b* abuts a lower portion of adjacent solar panel frames 26 and the washer 70 is secured against an upper portion of the solar panel frames 26. In the illustrated embodiment, the nut 64*b* threadably engages the elongate portion 62*b* to clamp the solar panel frames 26 between the nut 64*b* and the washer 70, and the nut 64*b* includes fingers 69*b* that extend along a portion of the elongate portion 62*b* to prevent rotation of the nut 64*b*. In some embodiments, the nut 64*b* can be spring-loaded toward the coupled position, such that, upon insertion of the second coupling device 34*b*, once the nut 64*b* is clear of the solar panel frame 26, the spring biases the nut 64*b* into the coupled position.

In the illustrated embodiment, the portions of the rotating portions 64*a*, 64*b* that engage the solar panel frames 26 have a roughened surface. The roughened surfaces engage the solar panel frames 26 and inhibit movement of the rotating portions 64*a*, 64*b* relative to the solar panel frames 26. Similarly, the surfaces of the washer 70 that engages the solar panel frame 26 have a roughened surface to inhibit movement of the strap 28 and washer 70 relative to the solar panel frame 26. In some embodiments, a bottom surface of the bracket 30 may have a textured surface that engages the solar panel frames 26. In some embodiments, the first and/or second coupling devices 34*a*, 34*b* include an actuator that is actuated by the user to move the rotating portions 64*a*, 64*b* into the coupled position. In some embodiments, the coupling device 28 is replaced with a molly bolt or other similar fastener.

Referring again to FIG. 7, the fence member 38 is coupled to the bracket 30 and includes a first portion 74, a second portion 76, and a third portion 78. The first portion 74 includes a generally planar surface oriented generally perpendicular relative to the solar panels 14 and extends along an axis 79 (FIG. 5) that is perpendicular to the axis 56 of the bracket 30. The first portion 74 extends generally parallel to the second elongate space 24. In other embodiments, the planar surface of the first portion 74 may be oriented in another direction relative to the solar panels 14 instead of perpendicular. The second portion 76 includes a projection or flange 82 that is configured to removably engage the slot 58 of the bracket 30. In the illustrated embodiment, the flange 82 engages the slot 58 in a dove-tail arrangement. The flange 82 extends in a direction that is generally parallel to the axis 56 of the bracket 30, and a first edge 86 of the flange 82 engages the slot 58 and a second edge 88 is secured by the locking member 40. The locking member 40 is coupled to the bracket 30 by, for example, a fastener 84. In other embodiments, the flange 82 may mate with the slot 58 without requiring a locking member 40 to secure the flange 82 relative to the bracket 30. The third portion 78 extends between the first portion 74 and the second portion 76. In the illustrated embodiment, the third portion 78 is formed as a pair of parallel support members 90.

Figure 9:
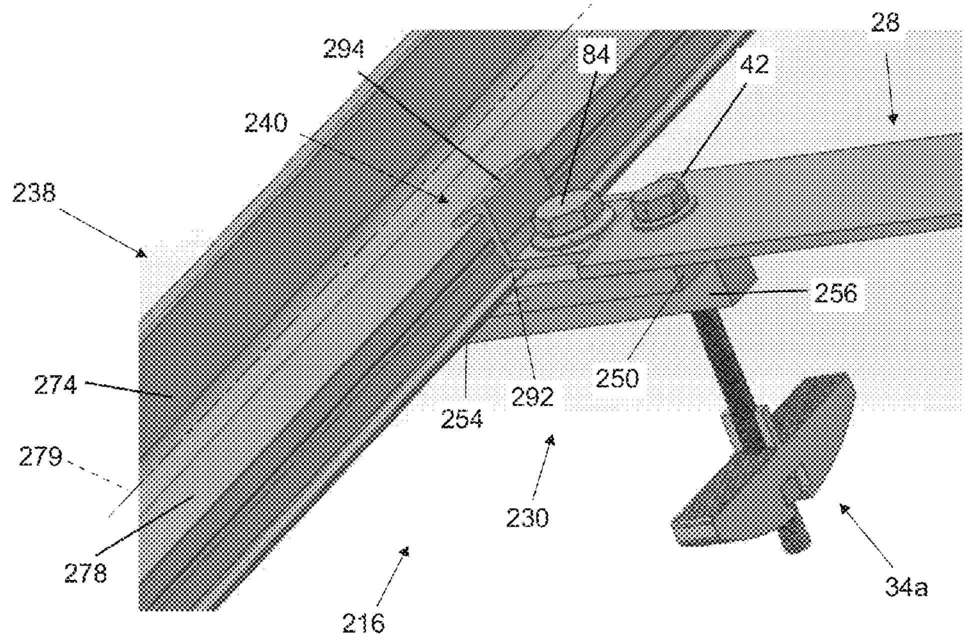
FIG. 9 is a reverse perspective view of a snow fence according to some embodiments.
Figure 10:
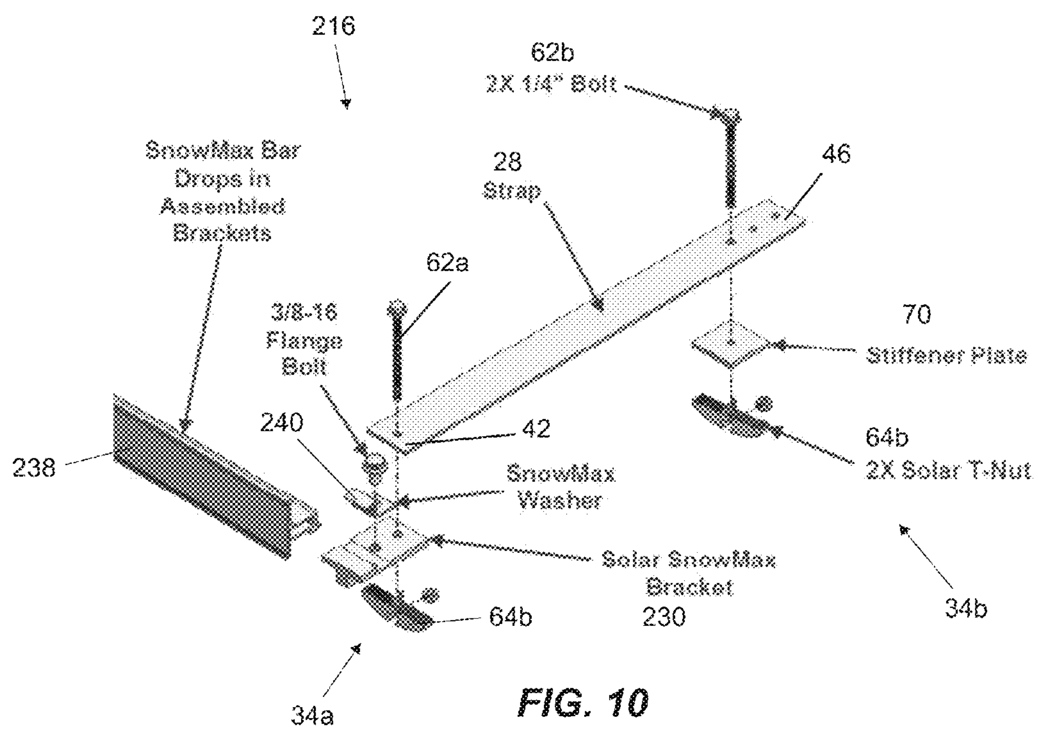
FIG. 10 is an exploded perspective view of the snow fence of FIG. 9.
Figure 11:
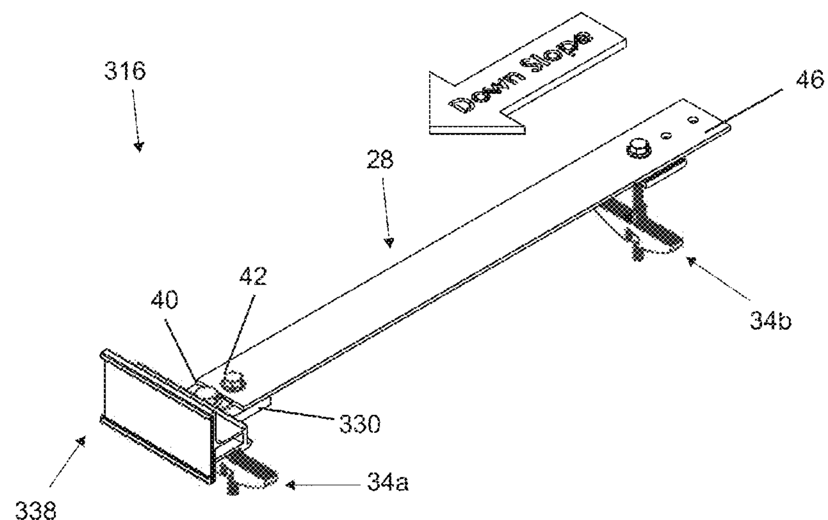
FIG. 11 is a perspective view of a snow fence according to some embodiments.

FIGS. 9 and 10 illustrate another embodiment of the snow fence 216. In this embodiment, the bracket 230 further includes a protrusion 256 positioned below the first end 250 and the second end 254 and extending downwardly toward the roof, substantially perpendicular to the bracket axis. The protrusion 256 extends between adjacent solar panel frames 26 to inhibit movement of the bracket 30 with respect to the solar panel frames 26. In addition, as best shown in FIG. 9, the snow fence 216 includes a locking member 240 including a tab or first portion 292 engaging the flange 82 of the fence member 238 and a lip or second portion 294 engaging the third portion 78 of the fence member 238. The second portion 294 of the locking member 240 provides additional engagement with the fence member 38 to secure the fence member 38 relative to the bracket 230. Furthermore, the first portion 274 of the fence member 238 extends above the third portion 278.

Figure 12:
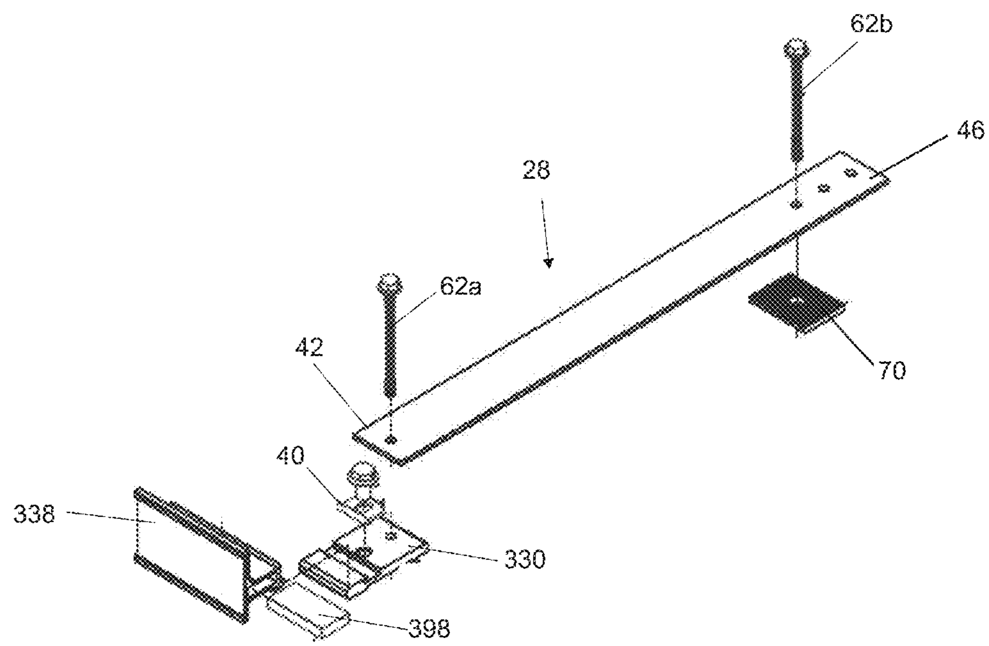
FIG. 12 is an exploded perspective view of the snow fence of FIG. 11.
Figure 13:
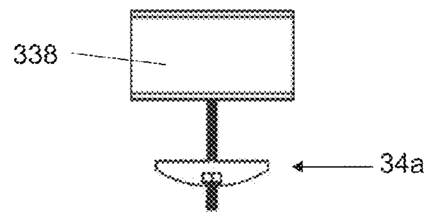
FIG. 13 is an end view of the snow fence of FIG. 11.
Figure 14:
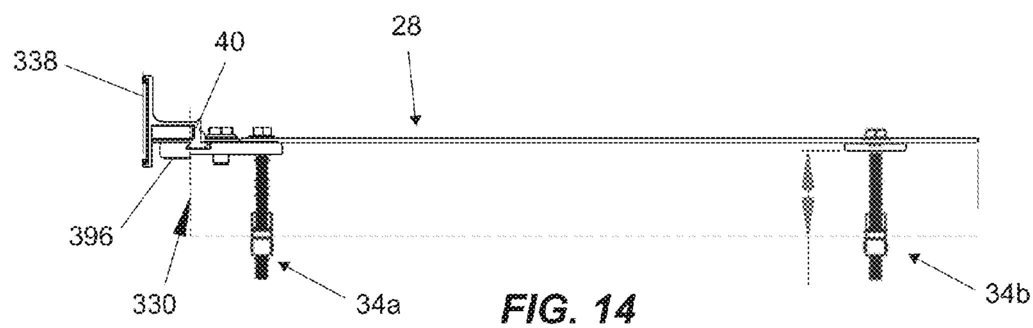
FIG. 14 is a side view of the snow fence of FIG. 11.
Figure 15:
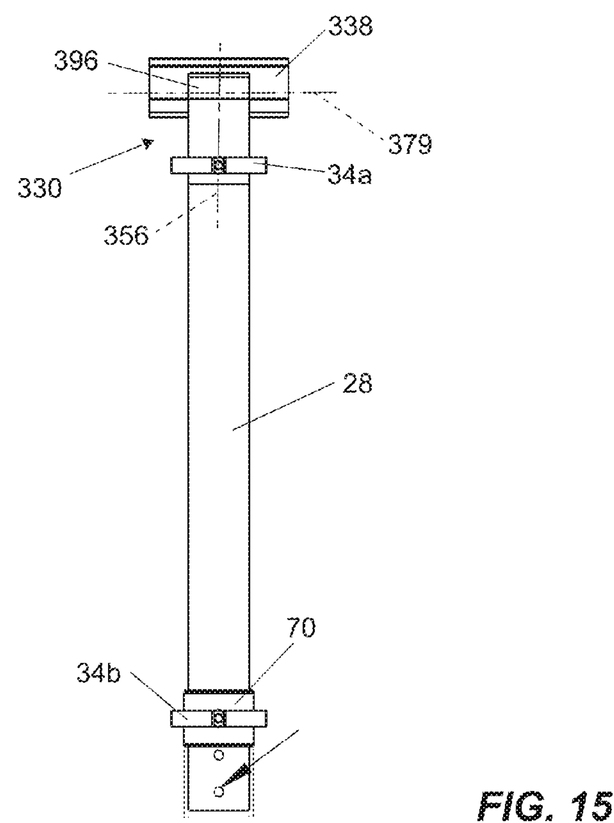
FIG. 15 is a bottom view of the snow fence of FIG. 11.
Figure 16:
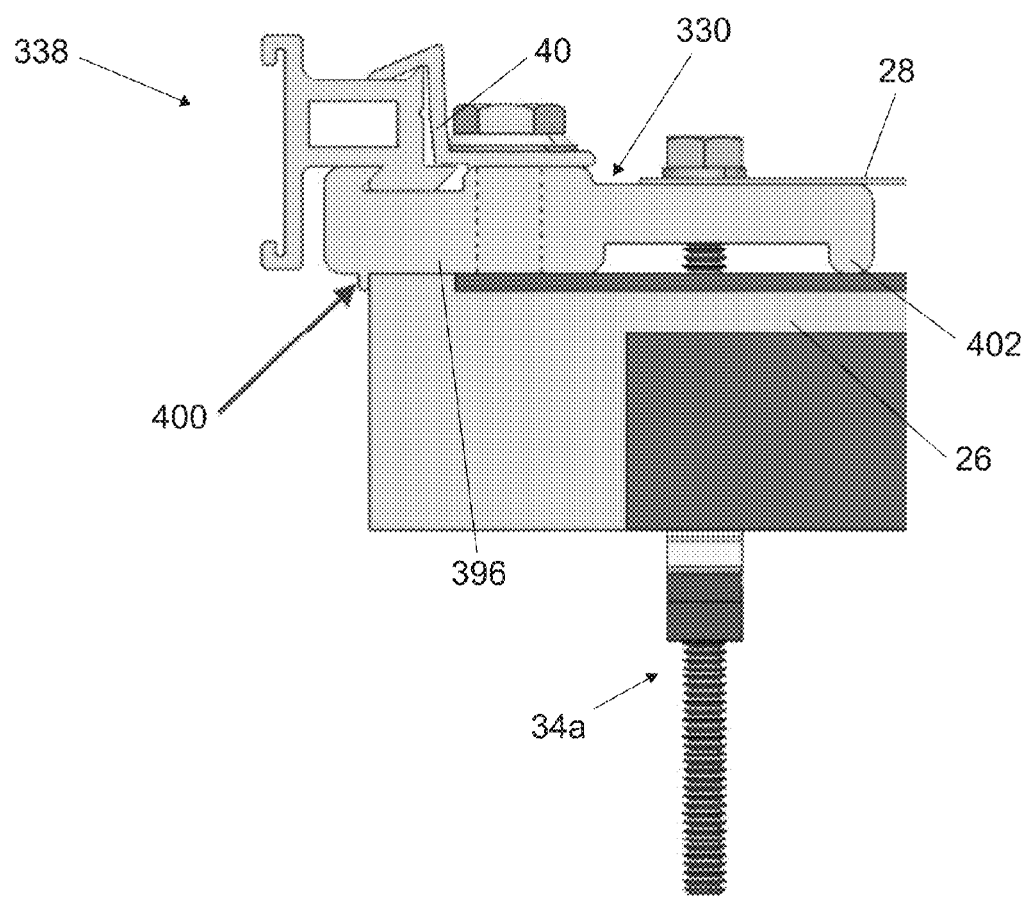
FIG. 16 is a side cross-section view of a snow fence according to some embodiments.

FIGS. 11-15 illustrate another embodiment of the snow fence 316. As best shown in FIG. 14, the lower surface of the bracket 330 includes a projection surface 396 proximate the fence member 38. As shown in FIG. 16, the projection surface 396 assists in locating the bracket 30 proximate a leading edge or long side 20 of the solar panel frame 26 during installation. Also, as shown in FIG. 12, a splice plate 398 is positioned between the parallel support members 90 of the fence member 38. The splice plate 398 extends between the fence member 38 and an adjacent fence member 38 to align the fence members 38 and provide rigidity. In other embodiments, shown in FIG. 16, the projection surface 396 includes a ridge 400. The ridge 400 abuts the leading edge of the solar panel frame 26 and assists in positioning the bracket 330 relative to the leading edge of the solar panel 26 during installation. The bracket 330 may also include a rear projection surface 402 that engages the top of the solar panel frame 26.

The embodiments described with respect to FIGS. 1-16 include the strap 28. The strap 28 is primarily coupled to brackets 30 positioned along the leading edge of a panel assembly 12 to further support the fence 16 from being pushed off the edge of the panel assembly 12 in the event of an excessive snow load. For example, a snow fence 316 positioned up-slope from the leading edge may not require a strap 28. In this case, the ridge 400 may engage the adjacent down-slope solar panel frame to prevent the bracket 330 from sliding downwardly.

Figure 17:
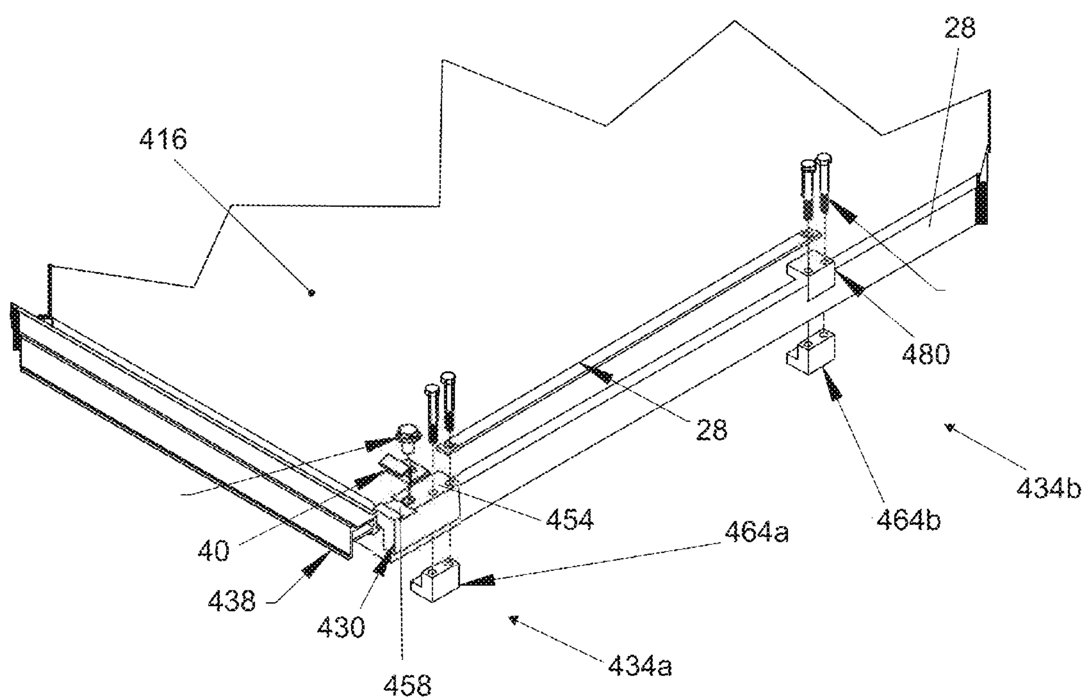
FIG. 17 is a perspective view of a snow fence according to some embodiments.
Figure 18:
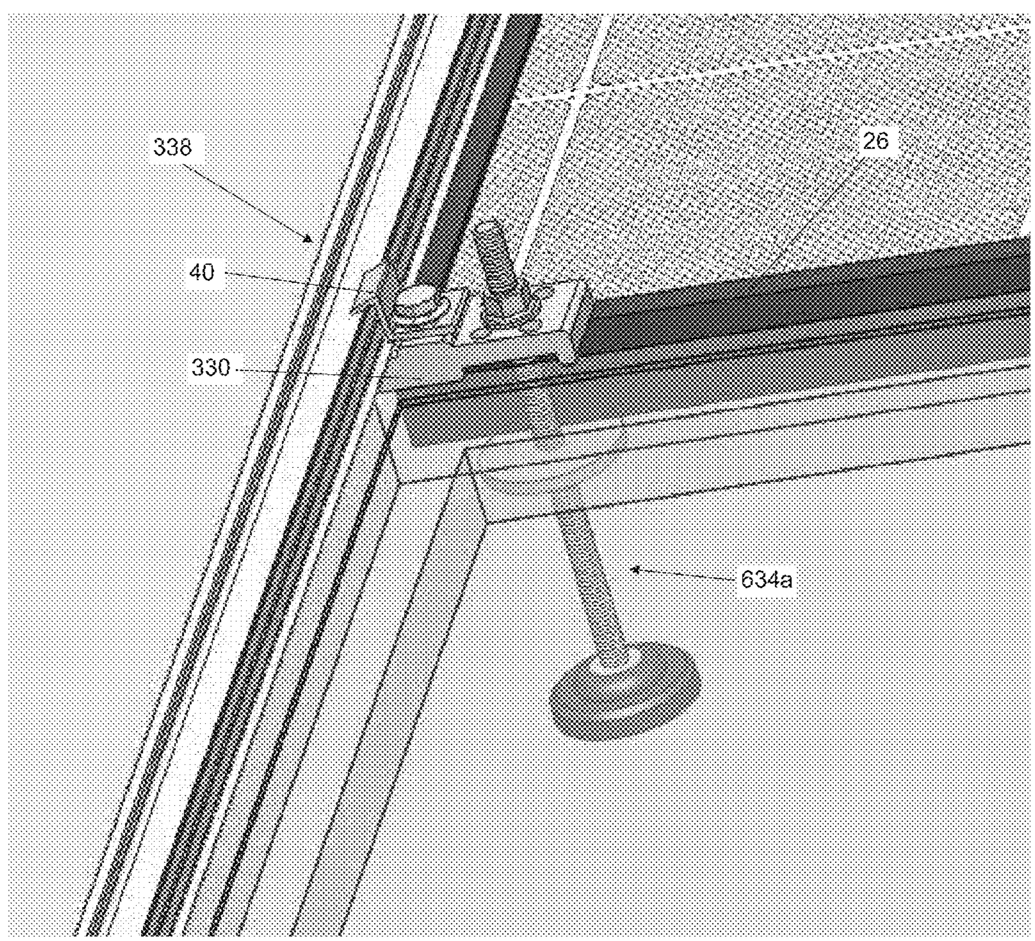
FIG. 18 is a perspective view of a snow fence according to some embodiments.
Figure 19:
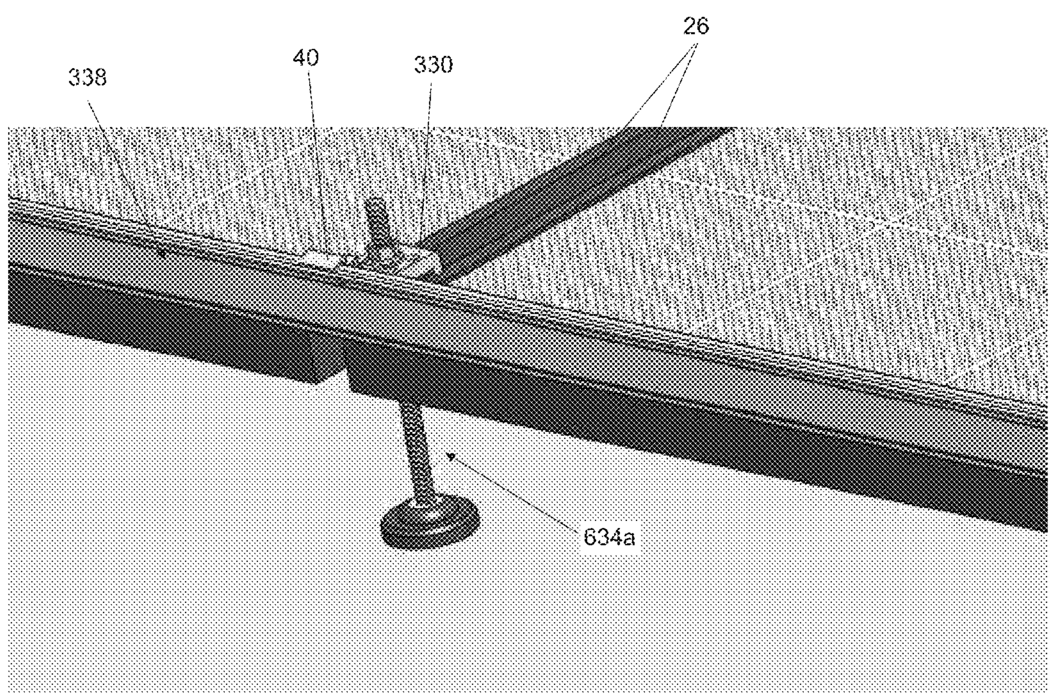
FIG. 19 is a front perspective view of the snow fence of FIG. 18.

FIG. 17 illustrates another embodiment of the snow fence 416. The snow fence 416 is positioned adjacent an outer edge of the solar panel assembly 12, adjacent at least one short side 18 of the solar panels 14. The bracket 430 includes a slot 458 and a second portion 454 that is coupled to the strap 28. In the illustrated embodiment, the bracket 430 is formed in an L-shape. The first coupling device 434*a* includes an L-shaped or angled bracket 464*a* which engages a bottom surface of the solar panel frame 26. An elongate member or portion 462*a* extends through the second portion 454 of the bracket 430 and engages the angled bracket 464*a* to secure the bracket 430 against the panel 26. The second coupling device 434*b* includes an upper angled portion 480 and a lower angled portion 464*b*. The upper angled portion 480 engages the top of the solar panel frame 26 and is positioned adjacent the strap 28, and the lower angled portion 464*b* engages the bottom surface of the panel frame 26. An elongate member or portion 462*b* extends through the upper angled bracket 480 and engages the lower angled bracket 464*b* to secure the strap 28 relative to the solar panel frame 26. In some embodiments, the strap 28 is included in a snow fence 416 that is positioned along a leading edge of the solar panel assembly 12, but is not included in snow fences 416 positioned up-slope from the leading edge. A fence member 438 is retained in the slot 458 and secured by the locking member 40 in a similar manner as described above with respect to FIGS. 9 and 10.

Other shapes, configurations and arrangements of the bracket are possible and the brackets 30, 230, 330, 430 illustrated here are given by way of example only. Additionally, any suitable fastener or fastener assembly can be utilized to couple the bracket to the solar panel frame 26 and the embodiments described and illustrated herein are given by way of example only.

Any of the brackets 30, 230, 330, 430 illustrated herein can be used to inhibit the movement of water, snow and ice along the respective solar panels. Additionally, or alternatively, the brackets 30, 230, 330, 430 and/or the strap 28 can be used for attaching conduit to the solar panels, including insulated wiring. In some embodiments, the strap 28 also supports a microinverter (not shown) assembly in communication with at least one of the solar panels 14 to control the operation of the solar panel. The microinverter may be positioned to a lower surface of the strap 28 so that the microinverter is not exposed. In another embodiment, the strap 28 supports a cleaning system for cleaning dust or other material from the surface of the solar panel 14. The cleaning system includes at least one nozzle for spraying a cleaning fluid (e.g., water or air) onto the surface of the panel 14. In some embodiments, the strap 28 is included in snow fences 16 positioned along a leading edge of the solar panel array 12, but is not coupled to snow fences 16 positioned at an intermediate point of the assembly 12. The brackets 30, 230, 330, 430 can have any suitable height extending above the respective solar panels 14. In some configurations, the brackets 30, 230, 330, 430 are of a size that will not allow the sun to cast a substantial shadow over an uppermost point of the brackets 30, 230, 330, 430 on the solar panels 14. Shadows cast on solar panels can diminish the efficiency of the solar panels.

Figure 20:
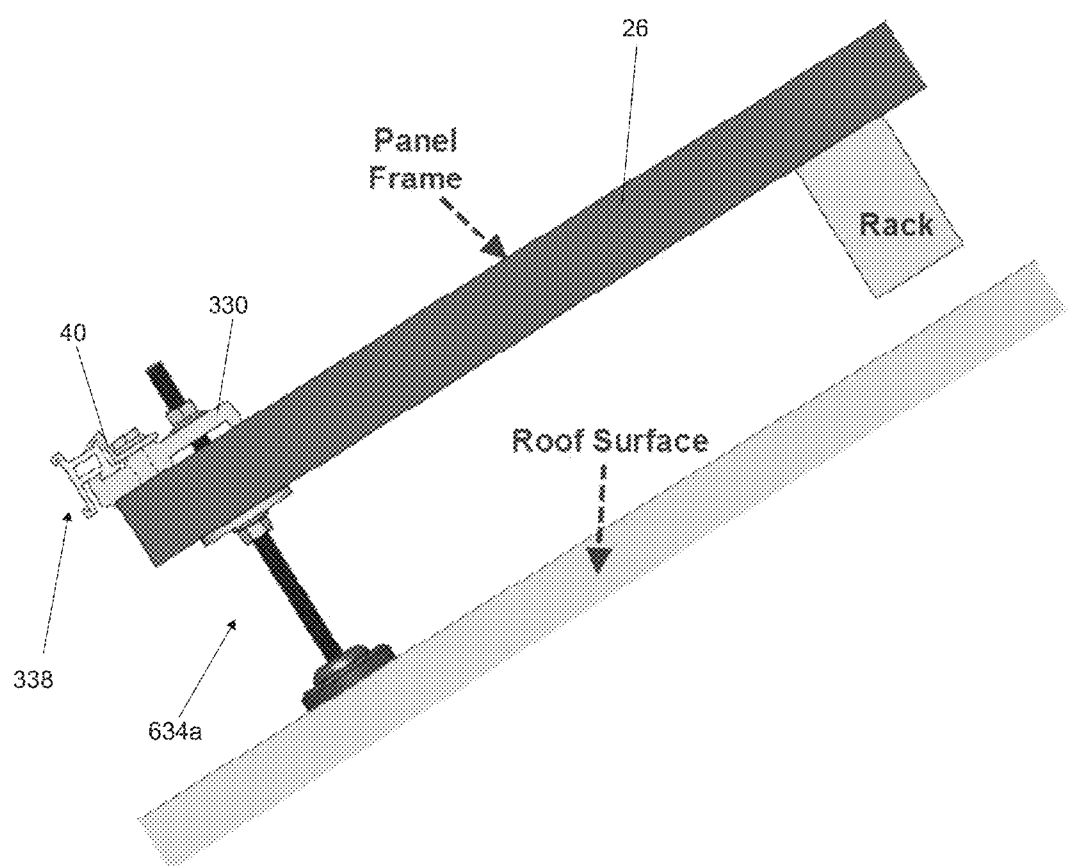
FIG. 20 is a side view of the snow fence of FIG. 18.
Figure 21:
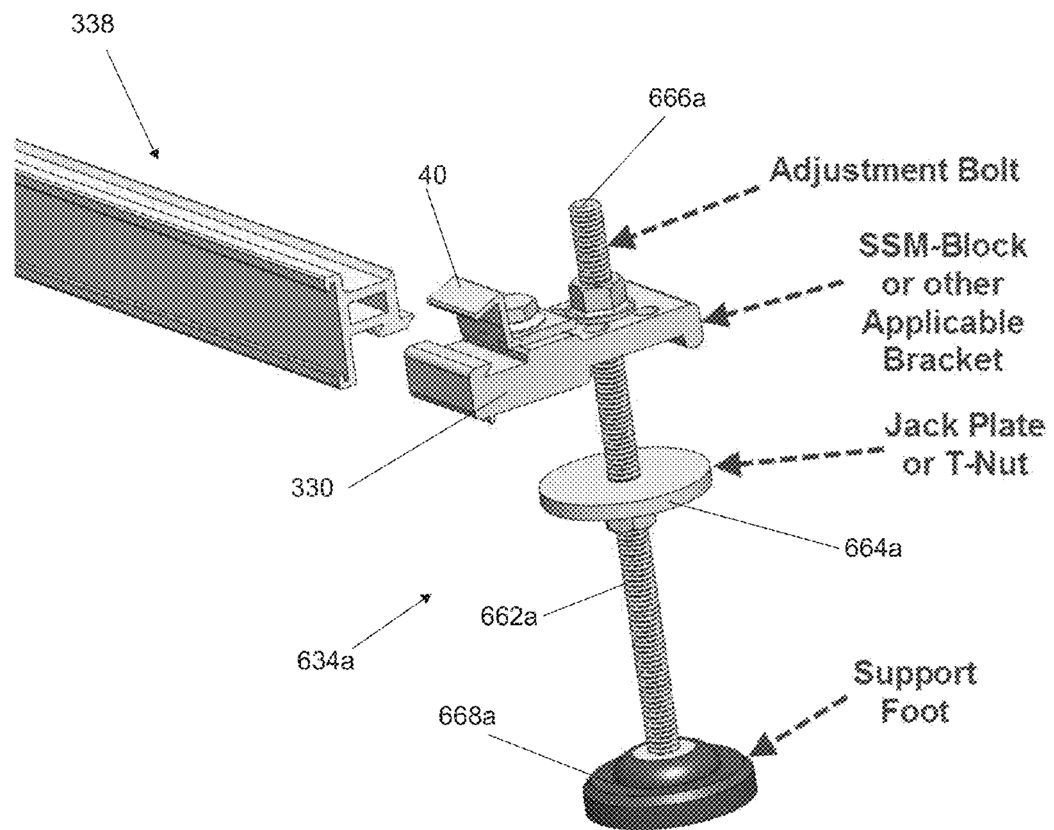
FIG. 21 is a partial exploded view of the snow fence of FIG. 18.
Figure 22:
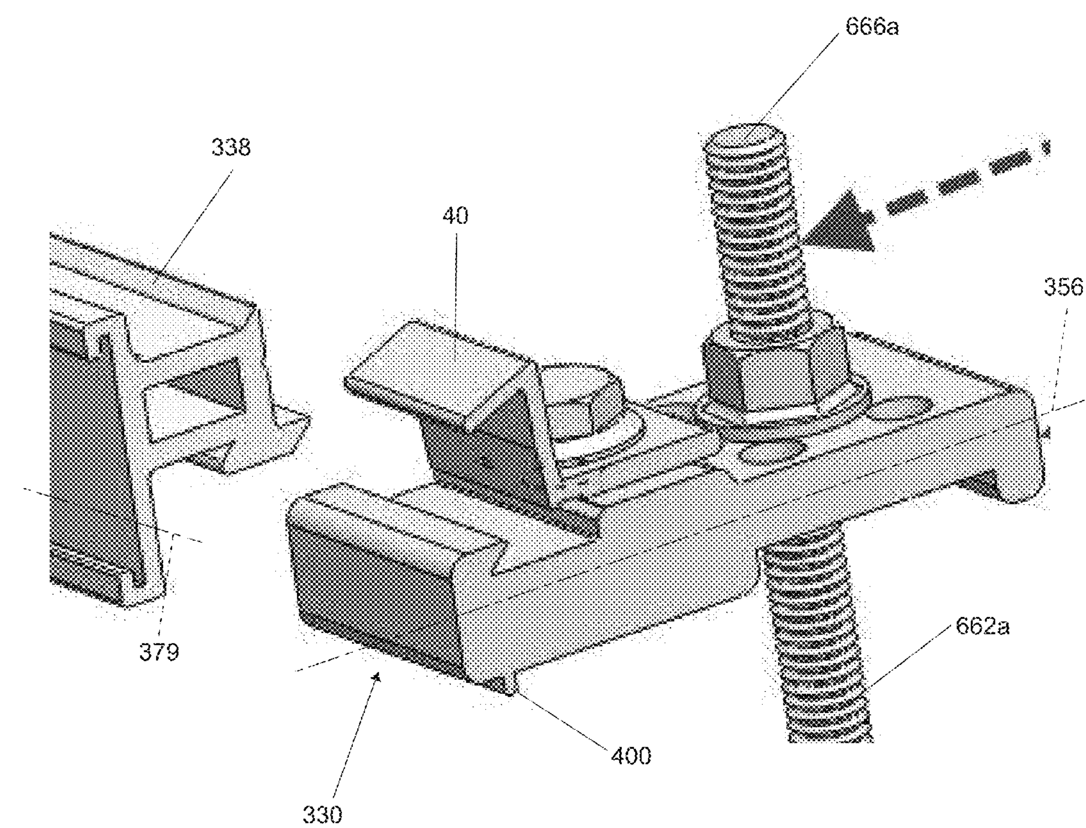
FIG. 22 is an enlarged view of the snow fence of FIG. 18.

FIGS. 18-22 illustrate the snow fence 316 including a coupling device 634*a* according to another embodiment. The bracket 630 is substantially similar to the bracket 330 described above with respect to the embodiment of FIG. 16. As shown in FIGS. 21 and 22, the coupling device 634*a* includes an elongate portion in the form of an adjustment bolt 662*a* and a rotating portion in the form of a jack plate 664*a* that is rotated until the plate 664*a* engages a bottom surface of the panel frame 26. The elongated portion 662*a* includes a first end 666*a* and a support foot 668*a* coupled to an opposite end of the bolt 662*a*. The support foot 668*a* engages an upper surface of the roof. As shown in FIG. 20, the panel frame is cantilevered from a rack and the load due to the weight of the snow retained by the fence 416 causes a bending moment on the end of the panel. The foot 668*a* provides additional support to resist the bending moment where the guard is attached.

In some embodiments, the snow fence can be dark in color. In some embodiments, the snow fence is black to absorb more heat and thereby encourage any snow on the snow fence to melt. The snow fences described and illustrated herein may be used as small individual components that increase friction to inhibit the movement of snow and ice. The snow fences may also be used in continuous runs for the same purpose or to function as a rain water diverter.

The invention claimed is:

1. An accessory for a solar panel assembly, the solar panel assembly including at least one solar panel having a panel frame supported on a surface, the accessory comprising:

a bracket having a top surface and a bottom surface, the bracket defining an elongated portion extending in a first direction, the elongated portion including a slot;

a connector coupled to the bracket and configured to engage at least one of the panel frames; and a fence member including a first portion, a second portion, and a third portion, the first portion extending above the third portion, the first portion including a planar surface oriented at an angle relative to the bracket, the second portion including a projection that removably engages the slot, and the third portion installable in and supportable by the bracket, wherein the bottom surface is configured to engage a solar panel frame and the top surface is configured to engage one of the second portion or the third portion, and wherein the first portion is configured to protrude above the solar panel frame to retain snow in response to being installed on the solar panel assembly;

a locking member that engages the second portion of the fence member to secure the projection within the slot;

wherein the locking member includes a flange extending over the second portion of the fence and a fastener for coupling the flange to the bracket, wherein tightening the fastener causes the flange to clamp the projection of the fence member within the slot.

2. The accessory of claim 1, wherein the first portion of the fence member extends in a direction that is substantially perpendicular to the first direction.

3. The accessory of claim 1, wherein the slot of the bracket and the projection of the fence member engage one another in a dove-tail arrangement.

4. The accessory of claim 1, further comprising a strap coupled to the bracket and configured to engage a second clamp spaced apart from the first clamp.

5. The accessory of claim 4, wherein the strap supports a microinverter that is in communication with the solar panel assembly.

6. The accessory of claim 4, wherein the strap supports a cleaning system for cleaning a surface of the solar panel assembly.

7. The accessory of claim 1, wherein the bracket further includes a protrusion extending substantially perpendicular to the first direction, the protrusion configured to be positioned between adjacent panel frames.

8. The accessory of claim 1, wherein the bracket includes a lower ridge configured to engage a front edge of the panel frame.

9. The accessory of claim 1, wherein the first connector includes a threaded fastener and a nut engaging the fastener, the threaded fastener including a first end adjacent the bracket and a second end, the nut threadingly received onto the second end of the fastener and configured to contact the panel frame, wherein threading the nut onto the fastener clamps the bracket onto the frame.

10. An accessory for a solar panel assembly, the solar panel assembly including at least one solar panel having a panel frame supported on a surface, the accessory comprising:

a bracket having a top surface and a bottom surface, the bottom surface including a flange that bisects and protrudes from the bottom surface, the bracket defining an elongated portion extending in a first direction, the elongated portion including a surface configured to contact the panel frame;

a threaded bolt having a first end proximate the elongated portion of the bracket and a second end;

a nut received onto the second end of the bolt and threadingly engaging the bolt;

a fence installable on the bracket and supported by the top surface in response to being installed, the fence configured to at least partially protrude above a portion of the solar panel assembly and retain snow, the fence including a first portion and a second portion, the first portion including a planar surface extending at an angle relative to the first direction of the bracket, the second portion including a projection that removably engages the bracket; and a locking member coupled to the bracket and including an end engaging the second portion of the fence to releasably secure the fence relative to the bracket;

wherein the bracket further includes a slot for receiving the projection of the fence;

wherein the end of the locking member is formed on a flange and extends over the second portion of the fence, the locking member further including a fastener for coupling the flange to the bracket, wherein tightening the fastener causes the flange to clamp the projection of the fence member within the slot.

11. The accessory of claim 10, wherein the slot of the bracket and the projection of the fence engage one another in a dove-tail arrangement.

12. The accessory of claim 10, wherein the flange is configured to be positioned between adjacent panel frames.

13. The accessory of claim 10, wherein the bracket includes a lower ridge configured to engage a front edge of the panel frame.

14. The accessory of claim 10, wherein threading the nut on the bolt causes the nut to contact the panel frame, thereby clamping the panel frame between the bracket surface and the nut.

* * * * *